United States Patent
Imano

Patent Number: 6,044,697
Date of Patent: Apr. 4, 2000

[54] WET CLUTCH BREAK-IN METHOD AND APPARATUS

[75] Inventor: Kenichi Imano, Toyota, Japan

[73] Assignee: Toyota Jidosha Kabushiki Kaisha, Toyota, Japan

[21] Appl. No.: 08/855,528

[22] Filed: May 13, 1997

[30] Foreign Application Priority Data

May 14, 1996  [JP]  Japan ................... 8-143539

[51] Int. Cl.⁷ .................................. G01M 15/00
[52] U.S. Cl. ........................... 73/118.1; 73/119 R
[58] Field of Search ..................... 73/118.1, 112, 73/116, 117.1, 117.2, 117.3, 119 R

[56] References Cited

U.S. PATENT DOCUMENTS

| | | | |
|---|---|---|---|
| 4,356,724 | 11/1982 | Ayoub et al. | 73/118.1 |
| 4,788,857 | 12/1988 | Myers | 73/118.1 |
| 4,805,446 | 2/1989 | Brown | 73/118.1 |
| 5,027,647 | 7/1991 | Shimanaka | 73/118.1 |
| 5,038,601 | 8/1991 | Renneker | 73/9 |
| 5,109,696 | 5/1992 | Bright et al. | 73/118.1 |
| 5,333,500 | 8/1994 | O'Daniel | 73/468 |
| 5,501,109 | 3/1996 | Naito et al. | 73/116 |
| 5,726,353 | 3/1998 | Matsuda et al. | 73/112 |
| 5,847,272 | 12/1998 | Schneider et al. | 73/118.1 |

FOREIGN PATENT DOCUMENTS

| | | |
|---|---|---|
| 5-172240 | 7/1993 | Japan . |
| 6-26530 | 2/1994 | Japan . |
| 6-63913 | 8/1994 | Japan . |
| 6-63914 | 8/1994 | Japan . |

*Primary Examiner*—Eric S. McCall
*Attorney, Agent, or Firm*—Burns, Doane, Swecker & Mathis, LLP

[57] ABSTRACT

In a wet-clutch break-in method, a torque converter assembly 1 incorporating a wet-type lockup clutch 8 is clamped between a lower-jig work receiving member 31 and an upper jig face plate 51, and the torque converter assembly 1 is filled with torque converter fluid supplied through a passage 34 extending inside an output shaft 26. Then a lockup-on pressure is supplied through a passage 36 extending between the output shaft 26 and a stator shaft 30 to bring a clutch disc 13 and a front cover 2 of the torque converter assembly into friction contact. The friction contact surfaces of the clutch disc and the front cover are made in the break-in process by rotating the upper jig face plate 51 by rotation of a motor transmitted by an input shaft 50 while stopping the output shaft 26 from rotating. Vibration occurring during the break-in is monitored by a vibration pickup disposed on the output shaft, and the motor rotation number or the lockup-on pressure is accordingly controlled, to avoid resonance of the break-in apparatus.

32 Claims, 9 Drawing Sheets

WET CLUTCH BREAK-IN METHOD AND APPARATUS

BACKGROUND OF THE INVENTION

1. Field of the Invention

The present invention relates to a method and an apparatus for breaking-in a wet clutch.

2. Description of the Related Art

A known wet clutch is used, for example, as a lockup clutch incorporated in a torque converter. A torque converter with a lockup clutch normally has problems, in which unpleasant vibration, so-called judder, is likely to occur due to stick slip. Since this vibration is produced by large changes of the friction coefficient in the friction-contact surfaces of clutch, the vibration can be significantly reduced or eliminated by leveling the friction coefficient through breaking-in of the wet clutch beforehand.

Japanese patent application laid-open No. Hei 6-26530 describes a break-in method for a multiplate friction engagement device, that is, another type of wet clutch, in which the surface of a clutch plate of the engagement device is finished to a predetermined surface roughness (0.1–0.4 $\mu$Ra) by rotating the clutch plate in the friction contact with an abrasive in an oil.

However, since this break-in method merely breaks in the clutch plate, that is, the counter member of a friction member (clutch disc), the friction coefficient of the friction contact surfaces will change when the engagement device is incorporated into a transmission. Thus, this method has problems in that the finishing of the clutch plate to a predetermined roughness does not readily reduce the vibration.

Instead of using the abrasive, the friction member can be used to break in the clutch plate together with the friction member (also described in the aforementioned patent application). However, since the friction contact conditions change when the friction member and the clutch plate are assembled into a transmission, the break-in achieved by this method is not sufficiently maintained in the final product. Thus this method still finds it difficult to significantly reduce the vibration.

SUMMARY OF THE INVENTION

Accordingly it is an object of the present invention to significantly reduce vibration by breaking in a wet clutch incorporated in an assembly as nearly finished product.

According to an aspect of the present invention, there is provided a break-in method comprising the steps of filling an assembly incorporating a wet clutch with a liquid, bringing a friction member of the wet clutch into friction contact with a counter member by a predetermined pressure, and then rotating the friction member and the counter member relatively to each other to break in the two members.

Thus, in the method of the present invention, breaking-in process is carried out by bringing the wet clutch into under a predetermined pressure in the assembly incorporating the wet clutch and filled with the liquid, the breaking-in effect is reflected directly on the finished product.

In the present invention, it is preferable to regulate the pressure for friction contact between the friction member and the counter member. Thus, conducting the break-in under a predetermined pressure optimal for the break-in, it can be done to stabilize the friction coefficient of the friction contact-surface of the wet clutch, so that substantially no vibration may occur.

Optionally, in the method of the present invention, the breakin-in may be carried out while measuring vibration occurring in the friction contact surfaces of the friction member and the counter member. In the case, an abnormal vibration of a break-in apparatus can be detected during conducting, and making it possible to take an appropriate counter-measure for abnormal vibration.

Furthermore, the method of the invention may determine a vibration frequency based on a measured result, and control the rotation speed difference between the friction member and the counter member or the pressure for friction contact between the friction member and the counter member so that the vibration frequency does not correspond to the inherent frequency of the break-in apparatus. This control avoids abnormal vibration of the break-in apparatus caused by resonance, while ensuring safe and continuous breaking-in operation.

It is also possible in the present invention to measure a friction torque occurring on the friction contact surfaces of the friction member and the counter member. In this case, a measured friction torque provides a basis for calculating the friction coefficient of the friction contact surfaces of the wet clutch, it becomes possible to determine whether the break-in has been sufficiently performed.

The break-in apparatus to perform the above method comprises supporting means for supporting an assembly incorporating a wet clutch, liquid supplying means for supplying a liquid into the assembly supported by the supporting means and for applying a pressure for friction contact between a friction member and a counter member of the wet clutch, and driving means to rotate the friction member and the counter member relatively to each other.

Preferably, the liquid supplying means comprises liquid pressure regulating means for regulating the pressure of the liquid supplied into the assembly.

The break-in apparatus of the present invention may further comprise a vibration sensor for measuring vibration occurring in the friction contact surfaces of the friction member and the counter member. For this construction, it is preferred to provide rotation control means for controlling the rotating means on the basis of a signal from the vibration sensor or friction contact-pressure-control-means for controlling the liquid supplying means on the basis of a signal from the vibration sensor.

In addition, the break-in apparatus of the invention may further comprise means for measuring a friction torque.

BRIEF DESCRIPTION OF THE DRAWINGS

The foregoing and further objects, features and advantages of the present invention will become apparent from the following description of preferred embodiments with reference to the accompanying drawings, wherein.

DETAILED DESCRIPTION OF PREFERRED EMBODIMENTS

Preferred embodiments of the present invention will be described in detail hereinafter with reference to the accompanying drawings.

Figure 3:
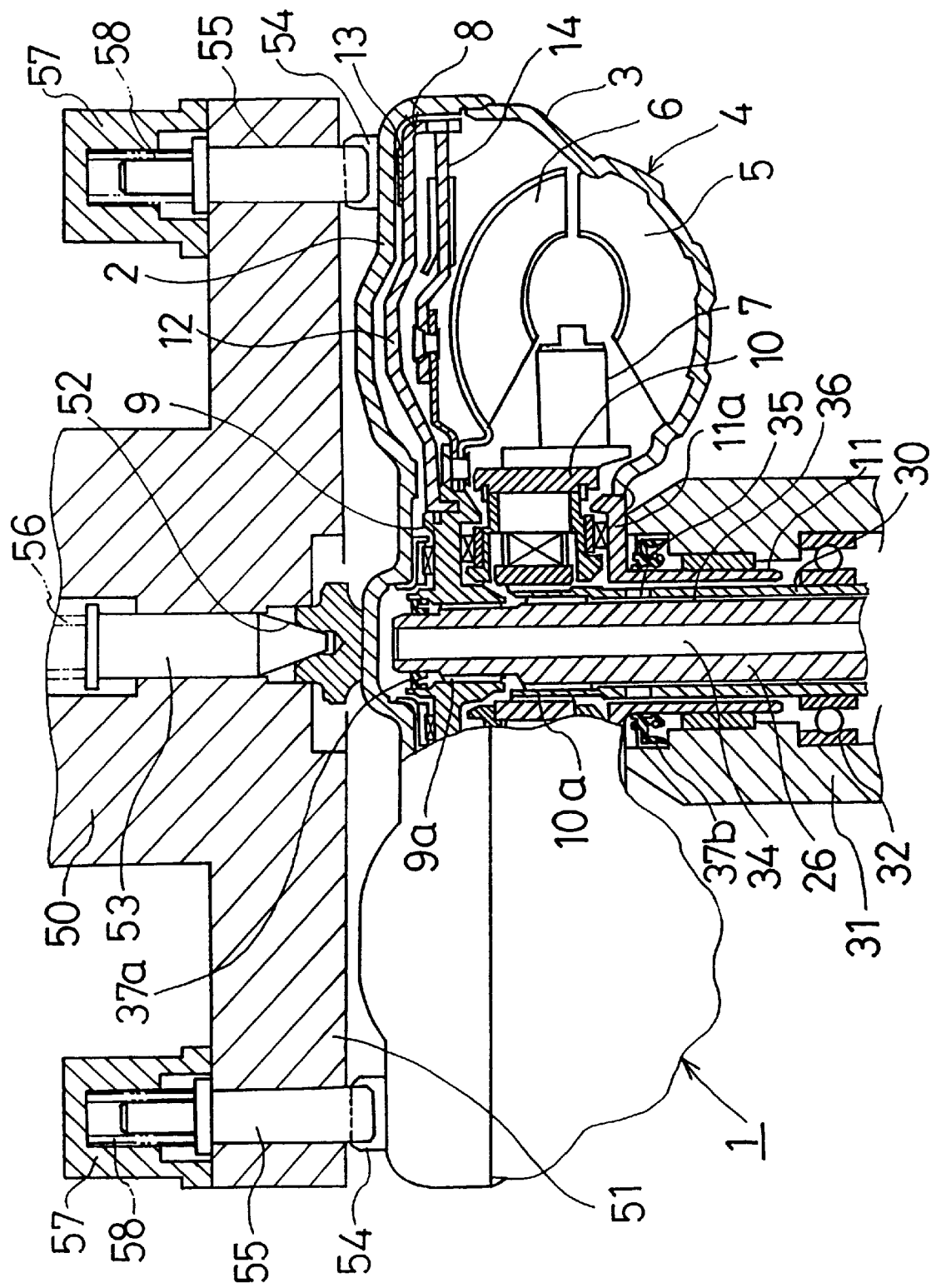
FIG. 3 is a sectional view of a supporting structure of a torque converter in the break-in apparatus.

A preferred embodiment of the invention is designed for a torque converter assembly 1 incorporating a wet-type lockup clutch as shown in FIG. 3. The torque converter assembly 1 has a casing 4 comprising a front cover 2 and a rear cover 3. Disposed inside the casing 4 are pump blades 5, turbine blades 6, stator blades 7 and a lockup clutch B. The pump blades 5 are formed on the inside bottom face of the rear cover 3, in a unit therewith, the turbine blades 6 and the lockup clutch 8 are supported on a hub 9 that is rotatably free disposed on the axis of the casing 4, and the stator blades 7 are supported by an one-way clutch 10 disposed on the axis of the casing 4. The hub 9 and the one-way clutch 10 have inside splines 9a and 10a, respectively. The rear cover 3 is connected at its rear end to a sleeve 11 having a flange 11a, so that the hub 9 and the one-way clutch 10 become coaxial.

The lockup clutch 8 comprises a lockup piston 12 fitted and fixed to the hub 9, and a clutch disc 13 joined to the surface opposite to the bottom surface of the front cover 2 at the outer circumference end side of the lockup piston 12. The lockup piston 12 is displaced to the bottom side of the front cover 2, which is located at one chamber in the casing 4 disposed with the pump blades 5 and the turbine blades 6 etc. due to the pressure of the after-mentioned oil A (FIG. 5), and so-called a lockup ON status is generated by the operation of the clutch disc 13 made of friction member being pushed to the bottom surface of the front cover 2. On the other hand, when the oil A of the torque converter is supplied between the front cover 2 and the lockup piston 12 by changing the flow direction of the oil of the torque converter, the lockup piston 12 is displaced departing from the bottom of the front cover 2 and the clutch disc 13 departs from the inner bottom of the front cover 2 to become a so-called lockup OFF status. As may be seen, the sign 14 is a lockup damper disposed at the rear side of the lockup piston 12 and supported by a hub 9.

Figure 1:
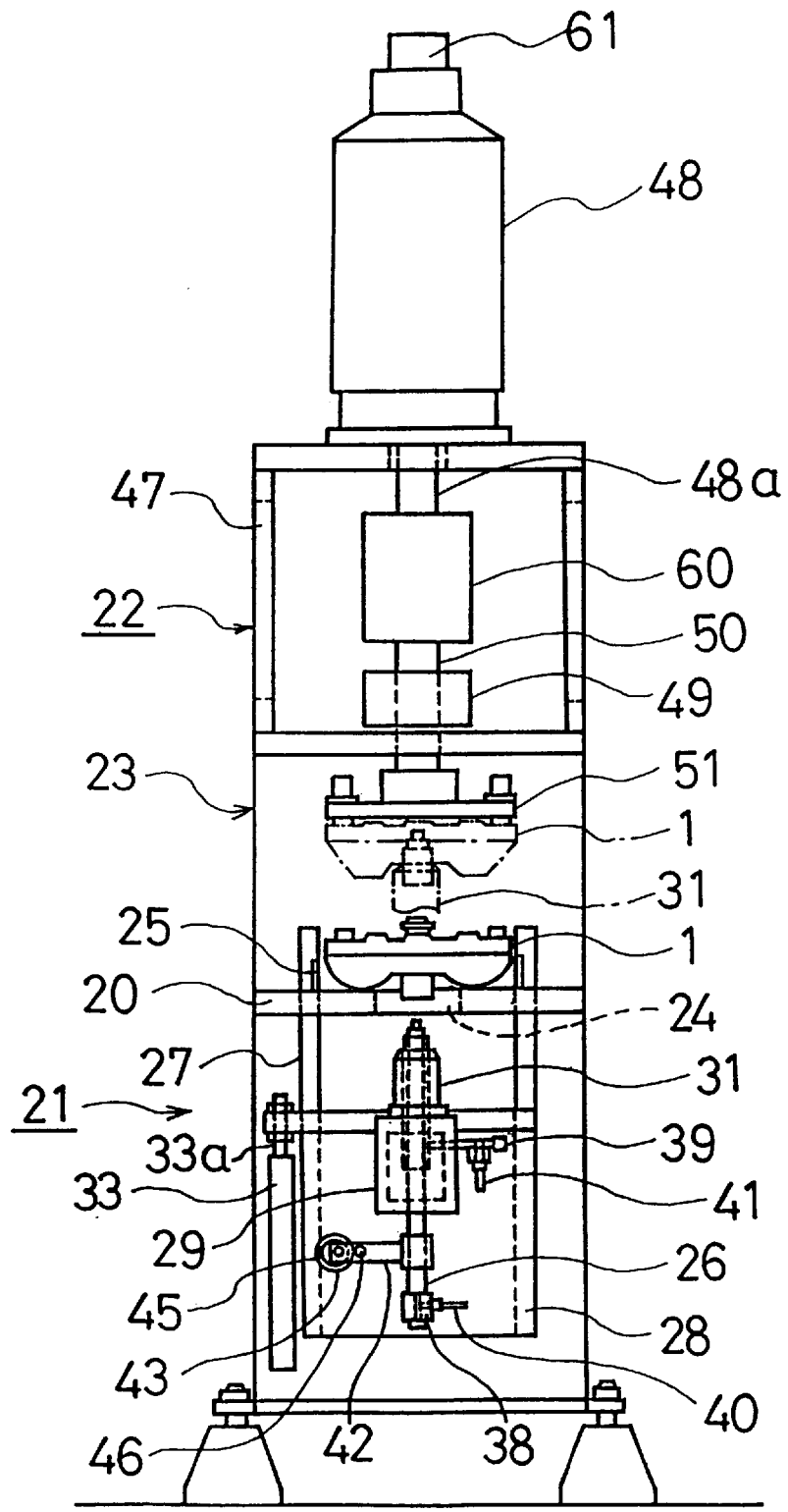
FIG. 1 is a front view of the overall construction of a preferred embodiment of the break-in apparatus of the present invention.
Figure 2:
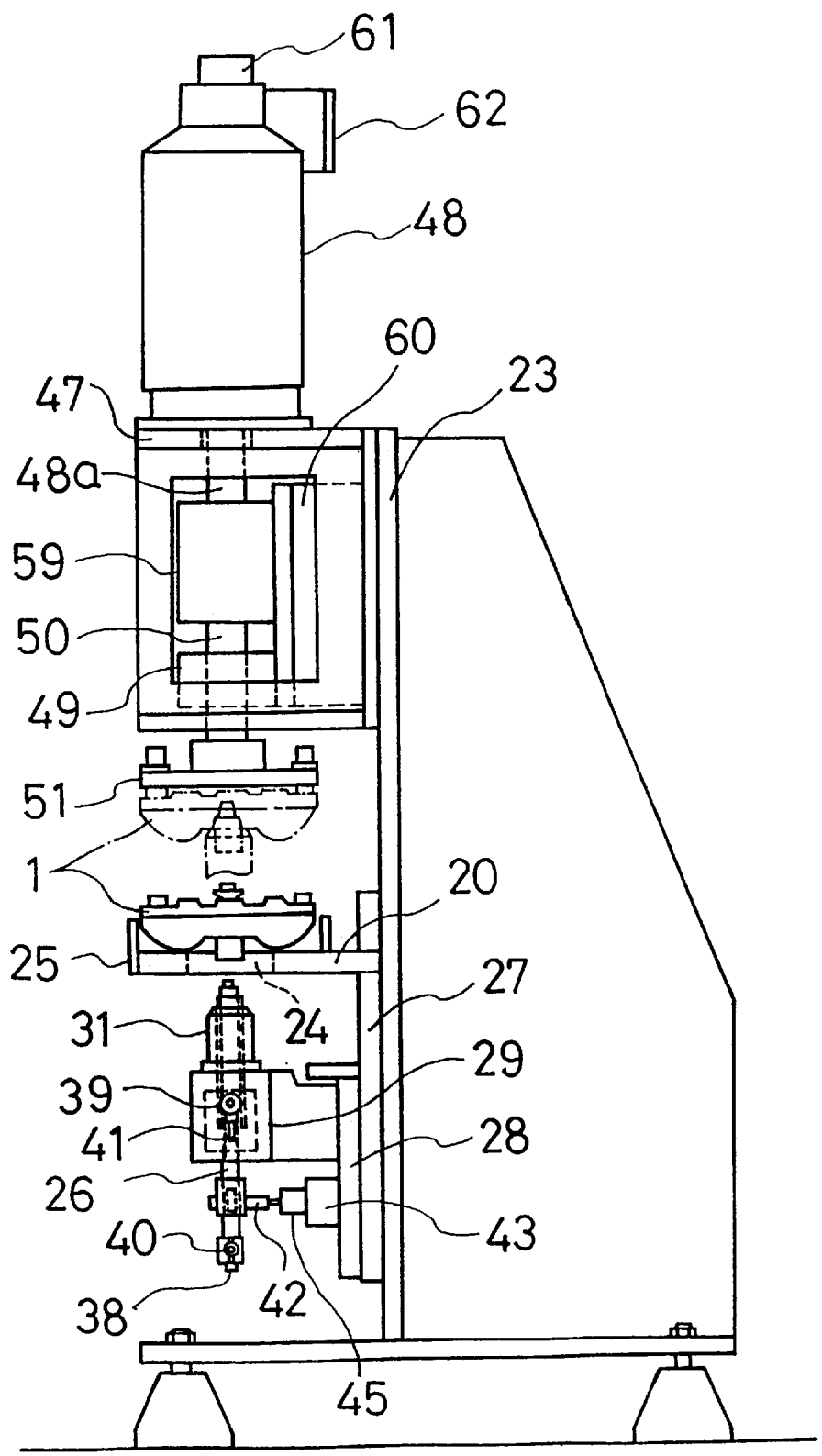
FIG. 2 is a side view of the overall construction of the break-in apparatus.

A break-in apparatus according to this embodiment comprises a work putting table 20 for putting and positioning the torque converter assembly 1, a lower jig 21 disposed below the work putting table 20, and an upper jig 22 disposed above the work putting table 20, all of which are supported on a column 23 provided stably on a floor, as shown in FIGS. 1 and 2. The work putting table 20 has an opening 24 of a given size formed in a substantially central portion of the table 20, and guide plates 25 disposed on the upper surface of the table 20 for guiding the torque converter assembly 1 in its outer surface. The torque converter assembly 1 is put on the work putting table 20 with the front cover 2 facing upward, thereby the torque converter assembly 1 is controlled to prevent from moving back and forth and to the right and left and is fixed in movement toward a horizontal direction.

The lower jig 21 has a hollow output shaft 26 the upper end of which is fittable to the inside spline 9a of the hub 9 of the torque converter assembly 1. The output shaft 26 is supported by a bearing box 29 freely rotatably but unmovably in the output shaft direction. In this bearing box 29, the proximal end portion of a cylindrical stator shaft 30, the distal end of which is spline-coupled with the inner diameter spline 10a of the one-way clutch 10 in the torque converter assembly 1, is supported (fixed). The stator shaft 30 surrounds the output shaft 26, leaving a small clearance (of about 1 mm) therebetween (see FIG. 3). The stator shaft 30 is fitted with a lower-jig work receiving member 31 that is capable of abutting against the flange 11a of the sleeve 11 of the torque converter assembly 1. The lower-jig work receiving member 31 is freely and rotatably connected by bearings 32 to the stator shaft 30 and the bearing box 29 (the bearing in the bearing box 29 is not shown). The output shaft 26 extends downward through the bearing box 29.

The slide plate 28 is connected to a piston rod 33a disposed in a cylinder 33 (air cylinder) fixed to the column 23 (see FIG. 1), and when the slide plate 28 is raised by operation of the cylinder 33, the lower-jig work receiving member 31 ascends together with the bearing box 29 so that the tip end of the lower-jig work receiving member 31 abuts against the flange 11a of the sleeve 11 of the torque converter assembly 1 placed on the work putting table 20, and raises the torque converter assembly 1. By this operation, the distal end portions of the output shaft 26 and the stator shaft 30 enter the sleeve 11 disposed in the torque converter assembly 1, and are spline-coupled with the inside splines 9a of the hub 9 and the inside splines 10a of the one-way clutch 10, respectively, and thus these are integrated with the torque converter assembly 1.

In the above integration manner, the hollow inside space of the output shaft 26 serves as a lockup-off pressure supply passage 34 (FIG. 3). the torque converter fluid A supplied through the supply passage 34 flows through the clearance between the front cover 2 and the hub 9, into the clearance between the front cover 2 and the lockup piston 12, and establishes the lockup-off state. Fluid holes 35 are formed in the stator shaft 30 and opens to a small clearance between the stator shaft 30 and the sleeve 11 (see FIG. 3). The aforementioned clearance between stator shaft 30 and the output shaft 26 serves as a lockup-on pressure supply passage 36, torque converter fluid A supplied into the supply passage 36 flows through the fluid holes 35 around the one-way clutch 10 and then into one of the two chambers of the casing 4, in which the pump blades 5, the turbine blades 6 and the like are disposed, to establish the lockup-on state.

The gaps between the output shaft 26 and the hub 9, and the sleeve 11 and the lower jig-work receiving member 31 are sealed with oil seals 37a and 37b respectively, so that the lockup-off pressure supply passage 34 and the lockup-on pressure supply passage 36 are kept liquid-sealed separately respectively. The torque converter fluid A supplied into the supply passage 36 flows through the fluid holes 35 around the one-way clutch 10, and into one of the two chambers of the casing 4, in which the pump blades 5, the turbine blades 6 and the like are disposed, to establish the lockup-on state. The torque converter fluid A is adapted to be supplied into the lockup-off pressure supply passage 34 and the lockup-on pressure supply passage 36 through a tube Joint 38 connected to the extension end of the output shaft 26 and a tube joint 39 connected to the bearing box 29, respectively, from a fluid supply device B (FIG. 5) provided for supplying fluid pressure, and the tube joints 38, 39 are provided with pressure sensors 40, 41 (FIGS. 1, 2).

Figure 4:
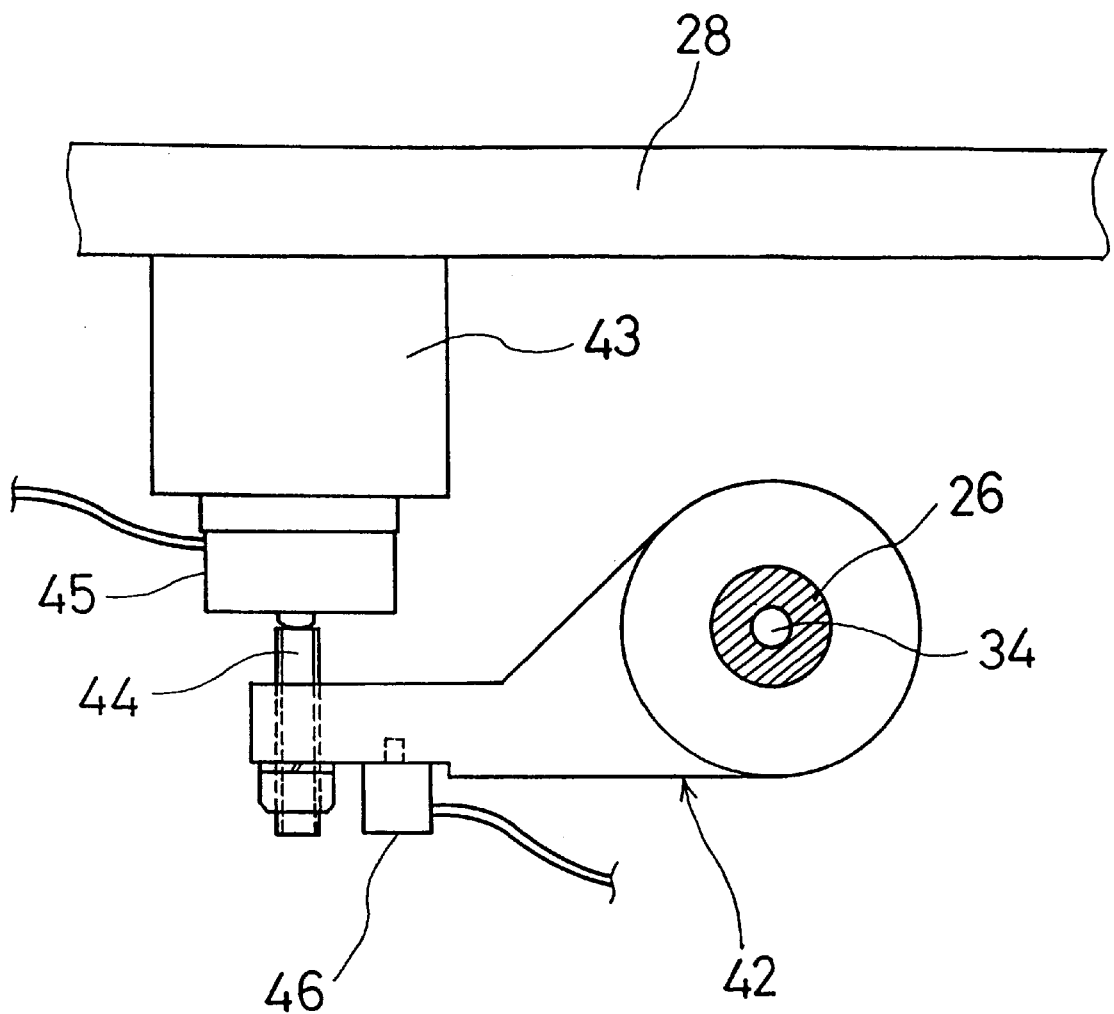
FIG. 4 is a plan view of a mount structure for a load cell for detecting a torque, a vibration pickup for sensing vibration, and the like partially in section.
Figure 5:
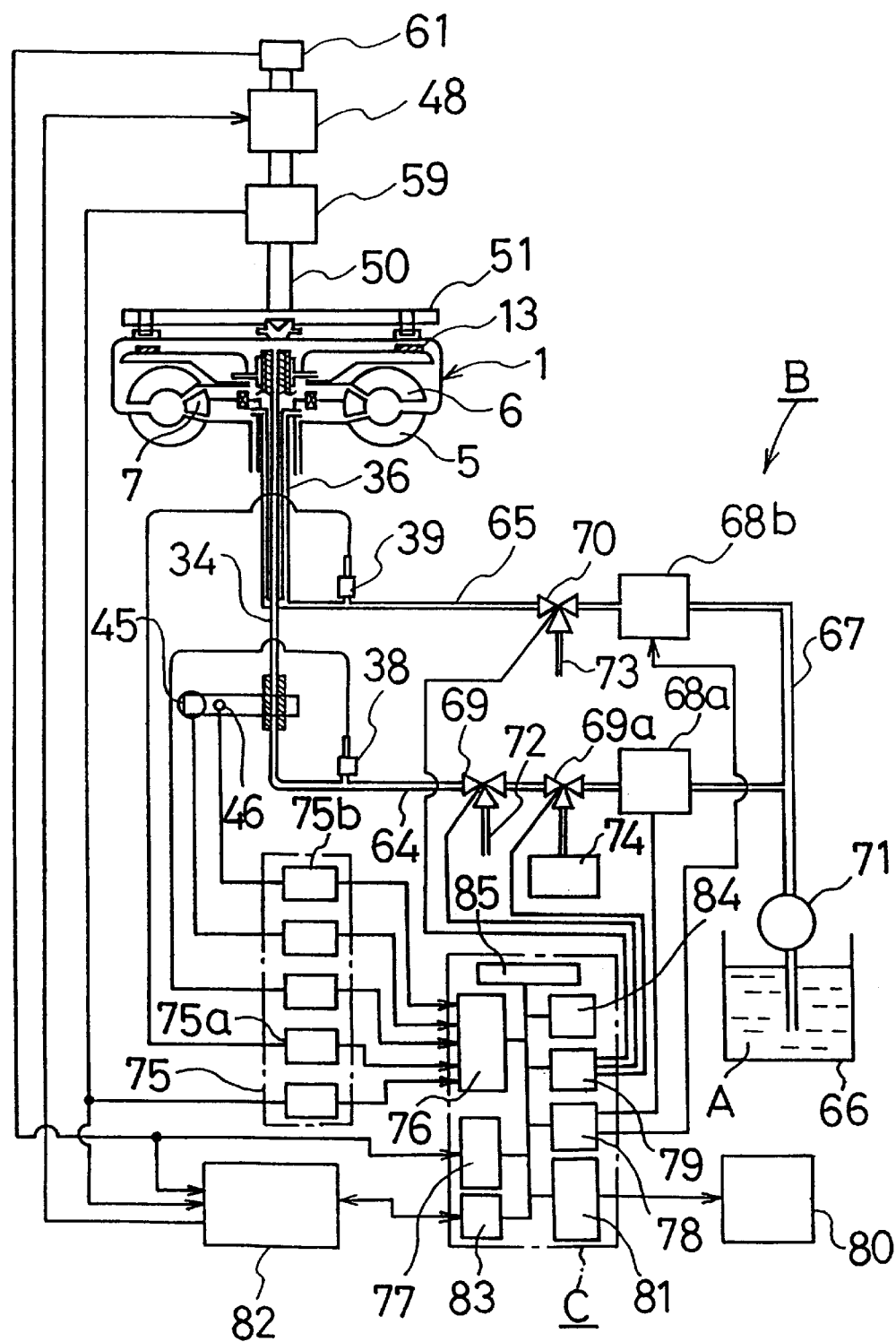
FIG. 5 is a system diagram illustrating in a unit a torque converter fluid supply system and a control system.

The extended portion of the output shaft 26 inserting the bearing box 29 is coupled with a proximal end portion of a sine bar 42 extending perpendicularly to the output shaft 26, as illustrated clearly in FIG. 4. On the other hand, the slide plate 28 carries a stopper block 43 fixed thereto and a load cell 45 is fixed to the distal end of the stopper block 43, for receiving a pressing rod 44 screwed to a free end portion of the sine bar 42. The output shaft 26 is prevented from being rotated by the contacting of the pressing rod 44 to the load cell 45, accordingly, the sine bar 42, the pressing rod 441 the stopper block 43 and the load cell 45 constitute a braking device for controlling the rotation of the output shaft 26. The load cell 45 also functions as a torque measuring device, by generating a voltage signal proportional to the torque applied to the output shaft 26 and outputting the signal to a later described control device C (FIG. 5). The sine bar 42 is provided with a vibration pickup 46, as a vibration sensor, that generates an analog voltage signal proportional to the vibration acceleration applied to the output shaft 26 and outputs the signal to the control device C.

The upper jig 22 comprises a motor (servo motor) 48 fixed to a support table 47 disposed on an upper portion of the column 23, and an input shaft 50 connected to the rotating shaft 48a of the motor 48 and extending downward through a bearing 49 fixed to the support table 47. The lower end of the input shaft 50 is provided with an upper jig face plate 51 that has a center piece 53, as shown in FIG. 3, fittable to a center pit 52 formed at the center of the front surface of the front cover 2 of the torque converter assembly 1, and engaging pins 55 engageable with two setting blocks 54 disposed near the peripheral edge on the front surface of the front cover 2 and spaced by an angle of 180°. Each engaging pin 55 is disposed in a pair respectively in such a manner as it sandwich or clamp one of the setting block 54. The center piece 53 and the engaging pins 55 are normally biased by a spring 56 disposed inside the input shaft 50 and springs 58 disposed in Spring boxes 57 secured to the rear face of the upper jig face plate 51, respectively, so as to protrude from the upper jig face plate 51. The center piece 53 and the engaging pins 55 thus biased to protrude reduce the impact caused when the front cover 2 abuts against the upper jig face plate 51.

In the above break-in apparatus, when the torque converter assembly 1 supported on the lower-jig work receiving member 31 of the lower jig 21 is ascended, the center piece 53 of the upper jig face plate 51 fits into the center pit 52 of the front cover 2, so that the torque converter assembly 1 is centered, simultaneously the engaging pins 55 disposed in the upper jig face plate 51 engage with the setting blocks 54 of the front cover 2, for preventing the torque converter assembly 1 from moving in circumferential directions. Therefore, when the motor 48 is rotated in this state, such rotation is transmitted by the input shaft 50 to the front cover 2 so that the pump blades 5 inside the torque converter assembly 1 revolve.

If the lockup clutch 8 is in the lockup-on state, where the clutch disc 13 and the inside bottom surface of the front cover 2 are in friction contact, then the rotation of the front cover 2 is transmitted through the lockup piston 12 and the hub 9 to the output shaft 26. Since the output shaft 26 is prevented from further rotating by the sine bar 42 abutting against the load cell 45, slipping occurs between the clutch disc 13 and the inside bottom surface of the front cover 2 and the break-in of the two members is carried out. The friction torque occurring in the output shaft 26 during the break-in is detected by the load cell 45.

A torque sensor 59 for detecting torque applied to the input shaft 50 is connected to an upper portion of the column 23 by a support 60, a rotary encoder 61 for detecting the number of rotation of the rotating shaft 48a of the motor 48 is connected to the motor case by a bracket 62 (FIG. 2). The torque sensor 59 generates a voltage signal proportional to the torque applied to the input shaft 50. The rotary encoder 61 generates a voltage signal proportional to the rotation speed of the motor 48. These voltage signals are outputted to the control device C.

Referring to FIG. 5, the fluid supply device B comprises a lockup-off pressure supply pipe (hereinafter referred to as "off-pressure supply pipe") 64 connected to the lockup-off pressure supply passage 34, a lockup-on pressure supply pipe (hereinafter referred to as "on-pressure supply pipe") 65 connected to the lockup-on pressure supply passage 36, and a fluid supply pipe 67 into which the two pipes 64 and 65 are joined and is connected to a tank 66 storing the torque converter fluid A. The off-pressure supply pipe 64 and the on-pressure supply pipe 65 are provided with electromagnetic proportion valves 68a and 68b as means for regulating liquid pressure, and eletromagnetic three-way valves 69 and 70, respectively. The fluid supply pipe 67 is provided with a hydraulic pump 71. Further a port of each of the electromagnetic three-way valves 69, 70 is connected to the tank 66 by a drain 72 or 73. And, the off-pressure supply pipe 64 is provided with a second electromagnetic three-way valve 69a connected to an air pump 74.

The electromagnetic proportion valves 68a or 68b and the electromagnetic three-way valves 69, 69a and 70 are adapted to be operated and controlled by the control device C, and the torque converter fluid A is supplied from the tank 66 selectively to the lockup-off pressure supply passage 34 or the lockup-on pressure supply passage 36 by switching the electromagnetic three-way valves 69 and 69a in the off-pressure supply pipe 64 and the electromagnetic three-way valve 70 in the on-pressure supply pipe 65. The lockup clutch 8 of the torque converter assembly 1 correspondingly becomes the lockup-off state or the lockup-on state.

The control device C comprises an A-D converter 76 that receives through a group of amplifiers 75 signals from the load sensor 45, the vibration pickup 46, the pressure sensors 38, 39 and the torque sensor 59, a counter 77 that inputs the signal from the rotary encoder 61, a D-A converter 78 for outputting control signals to the electromagnetic proportion valves 68a, 68b, a relay output 79 for outputting control signals to the electromagnetic three-way valves 69, 69a and 70, a cathode ray tube (CRT) interface 81 for outputting a CRT signal to an external CRT 80, a digital input/output 83 for outputting signals to and receiving signals from an external motor control device 82, a memory 84, and a central processing unit (CPU) 85.

A break-in method employed by the break-in apparatus according to this embodiment will be described, To break in the lockup clutch 8 of the torque converter assembly 1, the lower-jig work receiving member 31 is first ascended together with the bearing box 29 by operating the cylinder 33, so that the torque converter assembly 1 positioned on the work placement table 20 is lifted by the lower-jig work receiving member 31, simultaneously, the output shaft 26 and the stator shaft 30 are inserted in the torque converter assembly 1, so that their distal end portions are spline-coupled to the hub 9 and to the inside spline 9a, 10a of the one-way clutch 10, respectively. The ascending of the lower-jig work receiving member 31 by the cylinder 33 finishes, when the center pit 52 and the setting blocks 54 provided on the front cover 2 of the torque converter assembly 1 become engaged with the center piece 53 and the engaging pins 55 provided in the upper jig face plate 51, respectively, thereby, the torque converter assembly 1 thus becomes clamped between the lower-jig work receiving member 31 and the upper jig face plate 51.

Next, the torque converter assembly 1 is filled with the torque converter fluid A. For this filling operation, the electromagnetic three-way valves 69, 69a are switched to open the off-pressure supply pipe 64, and the electromagnetic three-way valve 70 in the on-pressure supply pipe 65 is switched to open the drain 73. Then the motor 48 is operated so that the input shaft 50 rotates at a medium speed of about 3000 rpm, simultaneously a maximum voltage is applied to the electromagnetic proportion valve 68a in the off-pressure supply pipe 64 to operate the hydraulic pump 71.

Then, the torque converter fluid A in the tank 66 is supplied into the torque converter assembly 1 through the off-pressure supply pipe 64 and the lockup-off pressure supply passage 34 extending inside the output shaft 26, and flows through the clearance between the front cover 2 and the hub 9 into the clearance between the front cover 2 and the lockup piston 12 to bring the lockup clutch 8 into the lockup-off state. The torque converter fluid A enters and fills a chamber inside the casing 4 in which the pump blades 5, the turbine blades 6 and the like are disposed. A surplus of torque converter fluid A flows around the one-way clutch 10, and enters the lockup-on pressure supply passage 36 between the stator shaft 30 and the output shaft 26, through the fluid holes 35 of the stator shaft 30, and then returns to the tank 66 through the on-pressure supply pipe 65 and the drain 73. The filling of the torque converter assembly 1 with the torque converter fluid A will be completed in a short period of time since the lockup-off pressure supply passage 34, through which the torque converter fluid A is supplied, has a relatively large flow path area and, in addition, the maximum voltage is applied to the electromagnetic proportion valve 68a for this supply operation.

After the torque converter assembly 1 is filled with the torque converter fluid A, the break-in of the lockup clutch 8 starts to be carried out.

In this break-in process, since the lockup clutch 8 needs to be in advance in the lockup-on state, the electromagnetic three-way valve 70 is switched to open the on-pressure supply pipe 65, and the electromagnetic three-way valve 69 in the off-pressure supply pipe 64 is switched to open the drain 72. When the hydraulic pump 71 is operated in this valve status, the torque converter fluid A is supplied from the tank 66 into the torque converter assembly 1 through the off-pressure supply pipe 64 and the lockup-on pressure supply passage 36, and flows through the oil holes 35 of the stator shaft 30 and then around the one-way clutch 10 and, further, enters one of the chambers inside the casing 4 in which the pump blades 5, the turbine blades 6 and the like are disposed. And due to the pressure build-up in the chamber, the lockup piston 12 displaces toward the inside bottom surface of the front cover 2, the clutch disc 13 is pressed against the inside bottom surface of the front cover 2, and the lockup clutch a thus becomes in the lockup-on state. A surplus of torque converter fluid A returns to the tank 66 through the lockup-off pressure supply passage 34, the off-pressure supply pipe 64 and the drain 72.

After the lockup clutch 8 becomes in the lockup-on state, the motor 48 operates the input shaft 50 to rotate at a given speed (for example, 300 rpm). Then, the rotation of the input shaft 50 is transmitted to the front cover 2, on one hand, the output shaft 26 being in friction contact with the front cover 2 through the clutch disc 13 is prevented from rotating by the load sensor 45 disposed on the stopper block 43, so that, slipping occurs between the clutch disc 13 and the inside bottom surface of the front cover 2, thus breaking in operation is carried out on the friction surfaces. The break-in effect K depends on the rotational speed difference $\Delta N$ between the input shaft 50 and the output shaft 26, the lockup-on pressure P that presses the clutch disc 13 against the inside bottom surface of the front cover 2, the break-in time T and the like. The break-in effect K is expressed as follows:

$$K = \alpha \times P \times \Delta N \times T \qquad (1)$$

where $\alpha$ is a coefficient.

Accordingly, in carrying out the break-in process according to the break-in apparatus, each of the above values P, $\Delta N$ and T, may be set in such a manner as a desired break-in effect K is attained, in this preferred (first embodiment), the break-in process is carried out under the so-called constant lockup-on pressure (constant liquid pressure) controlling by setting the voltage to be applied to the electromagnetic proportion valve 68b in the on-pressure supply pipe 65 to such an appropriate level that the lockup-on pressure P becomes a given optimal value. Since, for efficient break-in, it is crucial to quickly establish a constant lockup-on pressure P with high precision, this embodiment performs the following feed-forward control to establish a constant lockup-on pressure.

That is, first, the voltage signal is amplified with the corresponding amplifier 75a of the group of amplifiers 75, and converted to a digital value using the A-D converter 76 provided in the control device C. Making this digital value as a, a difference c is obtained from a preset target value b (c=a−b). The difference c is multiplied by a coefficient $\beta$ to determine a correction amount c' (=c·$\beta$), the correction amount c' is added to a digital value d being converted to an analog value by the D-A converter 78, to obtain a corrected digital value d' (=d+c'). Then the D-A converter 78 converts the corrected digital value d' to an analog voltage and outputs the analog voltage to the electromagnetic proportion valve 68b to obtain a stable and arbitrary lockup-on pressure P with reduced fluctuation.

During an initial period of the break-in process started as described above, the friction coefficient $\mu$ considerably changes, so that vibration is likely to occur in the friction contact surfaces of the lockup clutch 8. The frequency of the vibration correlates with the rotation speed of the torque converter assembly 1, that is, with the number of rotation of the motor 48. For example, if the motor speed is 300 rpm and vibration occurs at a rate of one oscillation per revolution, then the vibration frequency becomes 5 Hz, if the vibration rate is two oscillations per revolution, two phases of vibration of 5 Hz occur, if the vibration rate is three oscillations per revolution, three phases of vibration of 5 Hz occur, and in any of such cases, the fundamental vibration of 5 Hz is combined with vibration of unstable frequency. If any integer-multiple of such vibration frequency coincides with the natural frequency of the break-in apparatus, a resonance occurs to cause a vibration with an increased amplitude and a danger of damaging or breaking the torque converter assembly 1 or the break-in apparatus.

Then, to prevent a resonance, a second preferred embodiment performs motor speed variable control or lockup-on pressure variable control (liquid pressure variable control) based on vibration data detected by the vibration pickup 46.

Figure 6:
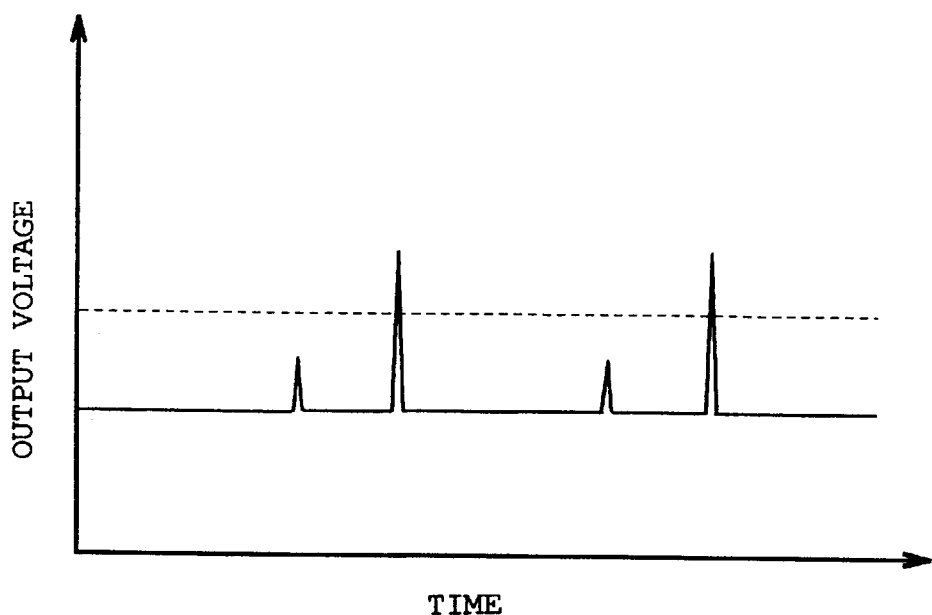
FIG. 6 is a graph showing the waveform of output from the vibration pickup as a vibration sensor.
Figure 7:
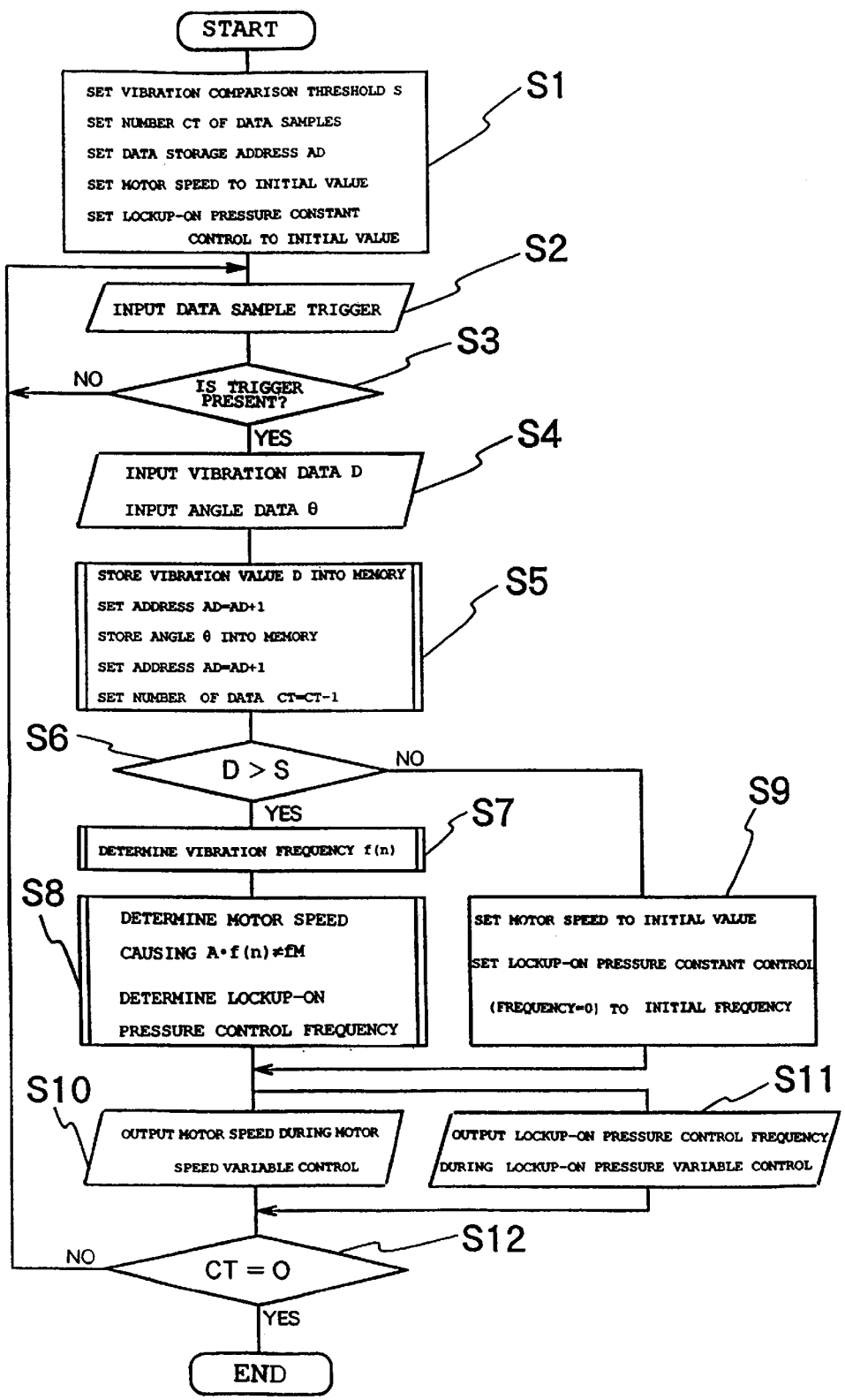
FIG. 7 is a flowchart illustrating control operation according to a preferred embodiment of the break-in method of the present invention.

During the break-in process as described above, the vibration of the friction contact surfaces is transmitted to the vibration pickup 46 via the lockup piston 12, the hub 9, the output shaft 26 and the sine bar 42, and the vibration pickup 46 outputs an analog voltage signal proportional to the acceleration of the vibration as indicated in FIG. 6, and the analog voltage signal is amplified by the corresponding amplifier 75b of the group of amplifier, and then converted into a digital value by the A-D converter 76 provided in the control device C. The following operation that follows according to the second embodiment will be described with reference to the flowchart shown in FIG. 7.

At the step S1, a vibration comparison threshold S, a data sample number CT and a data storage address AD are set, and also the number of rotation of the motor (work driving rotation number) and the lockup-on pressure constant-control to their respective initial values. Then, at the step S2 a data sample trigger is input. The triggering is carried out by generating an interrupting once at every given time based on a clock provided in the control device C, for example, once several dozens of microseconds. And at the step S3, it Is checked whether a trigger occurred, if a trigger did not occur, the operation returns to step S2, and if it did, the operation proceeds to the step S4. At the step S4, the analog voltage signal generated in the vibration pickup 46 is converted a digital value using the A-D converter 76, and makes the value as a vibration level measurement (vibration value) D, and a value from the counter 77 counting the number of pulse signals from a rotary encoder 61 is input as an angle θ corresponding to the rotational angle of the torque converter assembly 1.

Subsequently, at the step S5 the vibration value D is stored in the memory 84 and the storage address AD is changed by +1, and the angleθ is stored in the memory 84 and the storage address is changed by +1 and the number CT of data sample is changed by −1. Next, at the step S6, the vibration value D is compared with the threshold value S, if the vibration value D is equal to or less than the threshold value S, it is determined that there is no vibration, and is followed by the step S9, the motor speed and the lockup-on pressure constant control is re-set in their respective initial value, and then the step S10 or S11 is carried out.

On the other hand, if the vibration value D is greater than the threshold value S, at the step S6, it is determined that there is vibration, and the operation proceeds to the step S7, in which the vibration frequency f(n) is obtained. From the content of the memory 84, of the vibration values D(n) within the vibration occurred before plural rotations of the torque converter assembly 1, the vibration value D(n) corresponding to the condition D>S is inspected and the angle θ (n) at the occasion is obtained. At that time, in case there are, for example, within several degrees, data corresponding to the condition D>S, since a plural times pf sampling of one vibration, it is assembled into one group of vibration a total number CNT of vibration groups is counted. And, if the counted value CNT equals 1, the vibration frequency f(n) can not be obtained, the process is advanced to the step S8. If the counted value CNT≧2, an angle θ (n), at which the vibration value D corresponds to the maximum vibration value D(n) in each vibration group. is selected to make it as a representative value of the group. Simultaneously, a difference Δθ (n) between the angle θ (n) of the first vibration group and the angleθ (n+1) of the next vibration group is obtained, and the differenceΔθ (n) is obtained up to the last vibration group.

Then a vibration period λ (n) and a vibration frequency f(n) are obtained by the following equations (2) and (3):

$$\lambda(n) = (\Delta\theta(n) \times R)/(360 \times 60) \quad (2)$$

$$f(n) = 1/\lambda(n) \quad (3)$$

where R is the number of rotation of the motor.

The operation proceeds to the step S8, in which a number of rotation of a motor and a lockup-on pressure control frequency are obtained in such a matter as none of multiples of the vibration frequency f(n) by an integer A (A=1, 2, 3 . . . ) coincides with the natural frequency $f_M$ of the break-in apparatus (A·f(n)≠$f_M$), that is, any resonance does not occur. If the rotation number of the motor is to be controlled variably, the operation proceeds to the step S10, and the the rotation number obtained in step S8 is output to the motor control device 82 to change the rotation number of the motor (servo motor) 48. If the lockup-on pressure variable control is to be carried out, the operation proceeds to the step S11, in which the D-A converter 78 outputs a control voltage based on the lockup-on control frequency obtained in the step S8, to the electromagnetic proportional valve 68b to change the lockup-on pressure. After that, the step S12 checks whether the data sample number CT has become zero, in case if CT=0, then the operation ends. And if the number CT of the data samples is not zero, the operation returns to the step S2 to continue data sampling.

Here, the motor rotation number variable control and the lockup-on pressure variable control will be described in detail.

For description of the motor rotation number variable control according to a third preferred embodiment, let it assumed that the natural frequency $f_M$ of the break-in apparatus is 305 Hz; the motor rotation number R is 300 rpm; the primary vibration frequency f(1) is 61 Hz; and the quintic vibration frequency f(5) is 305 Hz, the quintic vibration frequency f(5) substantially coincides with the natural frequency $f_M$ of the break-in apparatus and, therefore, there is a danger that the resonance will occur. If the quintic vibration frequency is changed to the value which is not threatened to generate the resonance, the break-in process can be continued without stopping the operation of the break-in apparatus. If 290 Hz, as for example, is selected as a value of the quintic vibration frequency f(5), the primary vibration frequency f(1) becomes 58 Hz, by which, the motor rotation number R may be changed to 285.2 rpm.

Figure 8:
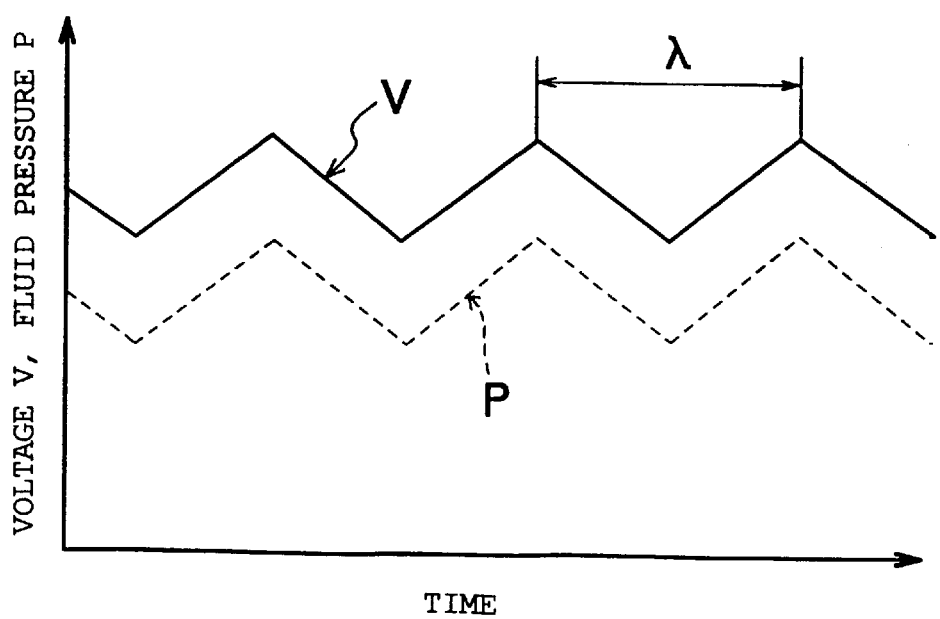
FIG. 8 is a graph indicating changes of the control voltage and hydraulic pressure caused by liquid pressure variable control.

On the other hand, in the case of the lockup-on pressure variable control according to a fourth preferred embodiment, let the case assumed that the natural frequency $f_M$ of the break-in apparatus is 305 Hz; the motor rotation number R is 300 rpm; the primary vibration frequency f(1) is 61 Hz; and the quintic vibration frequency f(5) is 305 Hz, as described above, there is a danger of resonance since the quintic vibration frequency f(5) substantially coincides with the natural frequency $f_M$ of the break-in apparatus. Then, as shown in FIG. 8, if a small vibration is intentionally added in the torque assembly 1 by alternating the lockup-on pressure P in a high and low pressure at a frequency that does not cause resonance, the resonance is avoided without stopping the break-in operation. Therefore, the repeating frequency λ alternating in high and low needs to be set to a value none of whose multiples equals either 305 Hz or 61 Hz, for example, to 58 Hz, at which lockup-on pressure may be changed.

According to the present invention, it is possible to monitor vibration during break-in based on the lockup-on pressure constant control (according to the first embodiment), and to switch to the motor speed variable control (according to the third embodiment) or to the lockup-on pressure variable control (according to the fourth embodiment) if there is a danger of resonance. This control coordination will prevent undesired vibration and, thereby, makes it possible to perform break-in without stopping the break-in apparatus. It is also possible according to the second embodiment to stop the break-in apparatus immediately when a danger of resonance is found, for safety purposes.

According to the present invention, it is also possible to measure the friction torque using the load cell 45 after the lockup clutch 8 has been made in the break-in process by every one of the above-described control modes, and the friction coefficient of the friction contact surfaces may obtain based on the measured result for seeing if the break-in process has been sufficiently carried out. A fifth preferred embodiment including such operation will be described below.

According to the fifth embodiment, the input shaft 50 is rotated at a given rotation number, for example, 100 rpm, by operating the motor 48, while the broken-in torque converter assembly 1 finished in the break-in process remains set in the break-in apparatus keeping the lockup clutch 8 in the lock-up on state. The rotation of the input shaft 50 is transmitted to the front cover 2, and the output shaft 26 is prevented from rotating by the load cell 45, so that a friction torque is generated on the friction contact surfaces between the clutch disc 13 and the inside bottom face of the front cover 2. The friction torque generated on the friction contact surfaces is transmitted to the load cell 45 by the sine bar 42 connected to the output shaft 26, and the load cell 45 then outputs an analog voltage signal proportional to the friction torque to the control device C.

At that time, the friction torque T is given by equation (4):

$$T = \mu \times \alpha \times P + \beta \times N^2 \quad (4)$$

where $\mu$ is the friction coefficient, P is the lockup-on pressure, N is the motor rotation number, and $\alpha$ and $\beta$ are coefficients.

Accordingly, a change in the friction coefficient $\mu$, that is, a major factor for undesired vibration, can be detected on the basis of a change in the friction torque T. Although the friction torque T varies depending on the lockup-on pressure P or the motor rotation number N, variations of the values P and N can be reduced to ignorable levels by regulating the lockup-on pressure P to a substantially fixed value according to the feedforward control described below, and regulating the motor rotation number to a substantially fixed value according to the revolution speed control of the motor 48.

Figure 9:
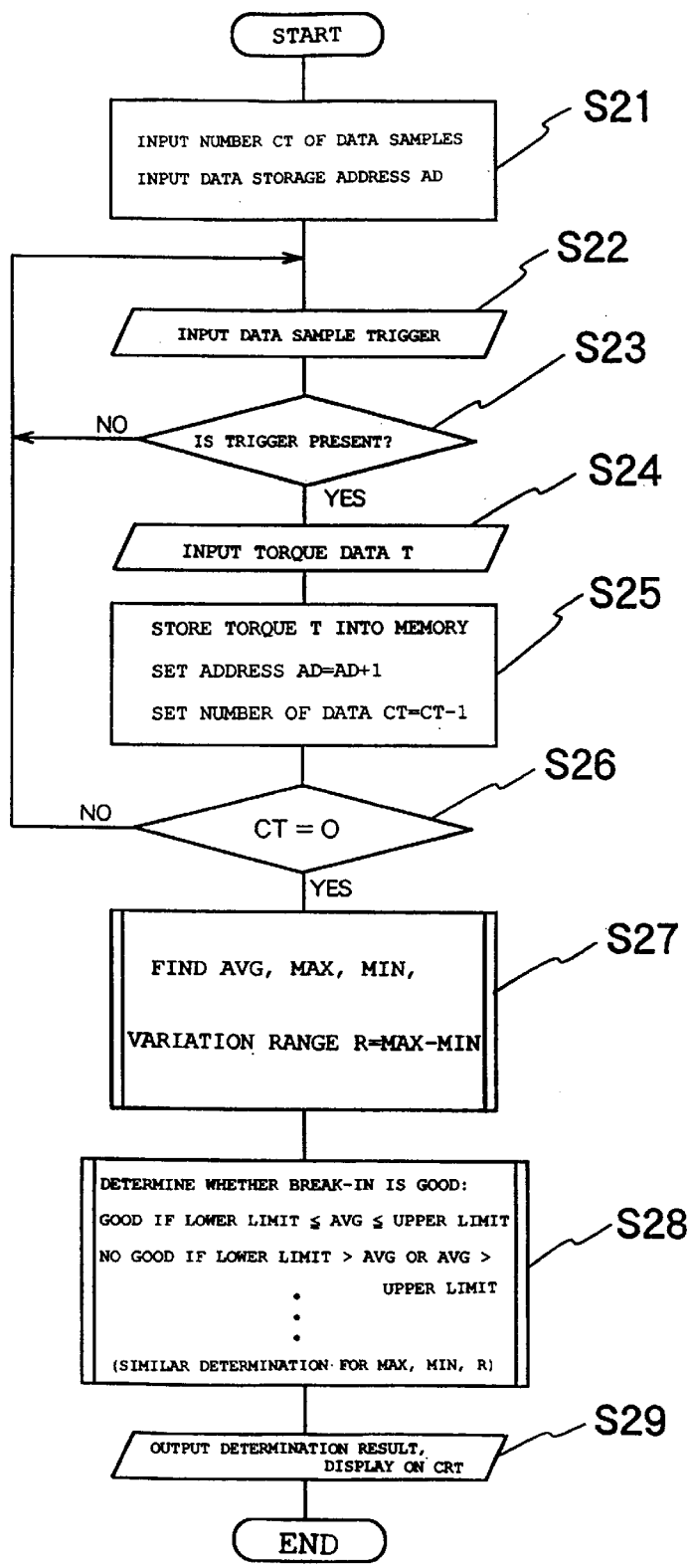
FIG. 9 is a flowchart illustrating control operation according to another preferred embodiment of the break-in method of the present invention.

FIG. 9 illustrates the flowchart for measuring the friction torque T and determining whether the measurement indicates sufficient break-in. At the step 21, the number CT of data samples and a data storage address AD are set, and then at the step S22, a data sample trigger is input. At this trigger an interrupting signal per fixed time based on the basic clock provided in the control device C, for example, is generated per several dozens of microseconds. Next, the step is transmitted to the step 23 and it is checked whether a trigger is present. If there is not a trigger, the step returns to the step S22. If there is a trigger, the operation proceeds to the step S24.

Figure 10:
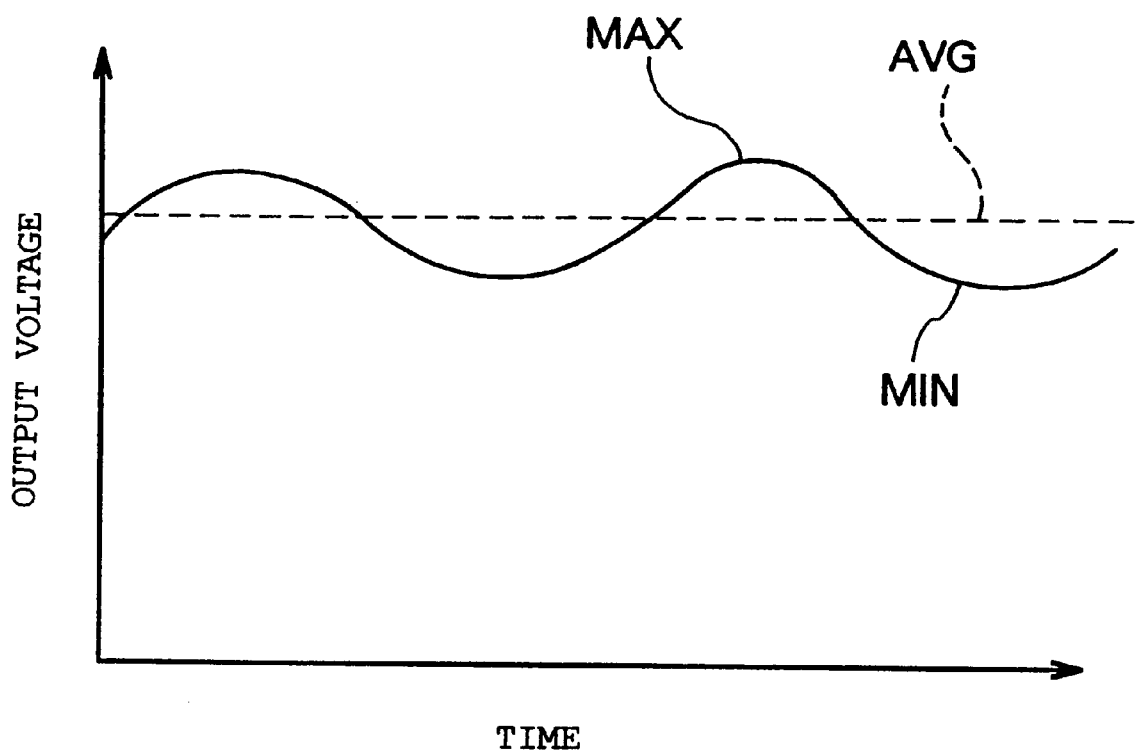
FIG. 10 is a graph showing the waveform of output from the torque detecting load cell.

In the step S24, the A-D converter 76 converts the analog voltage signal output from the load cell 45 proportional to the friction torque into a digital value, which is determined as a torque value T. The output signal from the load cell 45 has a waveform that oscillates within a certain range as shown in FIG. 10. Then, at the step S25 the torque value T is stored in the memory 84, and the storage address AD is changed by +1 and the number CT of data samples is changed by −1. In the step S26, it is checked whether the number CT of data samples is zero. If CT=0, then the operation proceeds to the step S27. If the number CT of data samples is not zero, the operation returns to the step S22 to continue data sampling.

At the step S27, an average value AVG, a maximum value MAX, a minimum value MIN and a variation range R (=MAX−MIN) are obtained as indicated in FIG. 10. Subsequently, in the step S28, compares the average AVG, the maximum MAX and the minimum MIN are compared with the the upperand lower limit values pre-stored in the memory 84, and it is determined good if the relation is: the lower limit≦AVG≦the upper limit; and no good if it is: the lower limit>AVG or AVG>the upper limit; good if it is: the lower limit≦MAX≦the upper limit; and no good if it is: the lower limit>MAX or MAX>the upper limit; good if it is: the lower limit≦MIN≦the upper limit, and no good if it is: the lower limit>MIN or MIN>the upper limit; and good if it is: the lower limit≦R or R≦the upper limit, and no good if it is :the lower limit>R or R>the upper limit, and next advanced to the step S29 the result of determination is displayed on the CRT 80, and the operation ends. If the determination is no good, the lockup clutch 8 may be carried out again by any one selected from the control modes according to the first to fourth embodiments.

After the finishing of the above series of break-in processes and, optionally, the measurement of friction torque, the electromagnetic three-way valves 69 in the off-pressure supply pipe 64 is switched to close the drain 72, and the electromagnetic three-way valve 70 in the on-pressure supply pipe 65 is switched to open the drain 73. Then, by switching the second electromagnetic three-way valve 69a to the the air pump 74, a compressed air is supplied into the torque converter assembly 1 through the off-pressure supply pipe 64 and the lockup-off pressure supply passage 34, discharging most torque converter fluid A from the torque converter assembly 1 into the lockup-on pressure supply passage 36. The torque converter fluid A then flows through the on-pressure supply pipe 65 and the drain 73, and then returns to the tank 66.

After that, the lower jig 21 is lowered by operation of the cylinder 33. During descending of the lower jig 21, the torque converter assembly 1 supported by the lower-jig work receiving member 31 reaches the work putting table 20 and stops to descend, and subsequently as the lower jig 21 further descends, the output shaft 26 and the stator shaft 30 come out of the torque converter assembly 1. When these shafts come out, a small amount of residual torque converter fluid A flows out of the torque converter assembly 1 through the sleeve 11, however, since the torque converter fluid A flows out downward, there is substantially no danger that torque converter fluid A will deposit on the external surface of the torque converter assembly 1. Thus the need for cumbersome cleaning operation is eliminated.

As understood from the above description, by carrying out the break-in process in a wet clutch under such a condition that, as if it is applied to an almost finished product, the break-in effect can be obtained to reduce the vibration generation.

In addition, during the break-in process by the measurement of vibration occurring in the friction contact surfaces, it is possible to predict an abnormal vibration of the break-in apparatus due to a resonance and it becomes possible to adopt appropriate counter-measures to prevent from generating such abnormal vibration. Thus the break-in apparatus and method according to the embodiments allow safe and efficient break-in of a wet clutch.

Further, during the break-in process, by the measurement of a friction torque occurring in the friction contact surfaces it becomes possible to determine whether the break-in is appropriate to allow a reliable quality control.

Furthermore, according to the break-in apparatus of the present invention, by the control of the liquid pressure supplied into the assembly, the rotation of a wet clutch and the like, the break-in process is easily carried out under optimal condition.

What is claimed is:

1. A wet-clutch break-in method comprising the steps of:
    filling an assembly incorporating a wet clutch with a liquid;
    bringing a friction member of the wet clutch into direct contact with a counter member by a given pressure; and
    rotating the friction member and the counter member relative to each other to break in the friction member and the counter member.

2. A wet-clutch break-in method according to claim 1, wherein said given pressure for friction contact between the friction member and the counter member is regulated to a given pressure optimal for the break-in.

3. A wet-clutch break-in method according to claim 1, further comprising the step of measuring vibration occurring in friction contact surfaces of the friction member and the counter member while carrying out the break-in process.

4. A wet-clutch break-in method according to claim 3, further comprising the steps of:
    obtaining a vibration frequency based on a measurement of vibration; and
    controlling a rotation number difference between the friction member and the counter member so that the vibration frequency does not accord with the natural frequency of a break-in apparatus.

5. A wet-clutch break-in method according to claim 3, further comprising the steps of:
    obtaining a vibration frequency based an the measured result of the vibration; and
    controlling the pressure for friction contact between the friction member and the counter member so that the vibration frequency does not accord with the natural frequency of the break-in apparatus.

6. A wet-clutch break-in method according to claim 1, further comprising the step of measuring a friction torque.

7. A break-in apparatus comprising:
    supporting means for supporting an assembly incorporating a wet clutch;
    means for supplying a liquid into the assembly supported by the supporting means and for applying a pressure for effecting direct contact between a friction member and a counter member of the wet clutch; and
    means for rotating the friction member and the counter member relative to each other to break in the friction member and the counter member.

8. A break-in apparatus according to claim 7, wherein means for supplying liquid comprises liquid pressure regulating means for regulating the pressure of the liquid to be supplied into the assembly.

9. A break-in apparatus according to claim 7, further comprising a vibration sensor for measuring vibration occurring in friction contact surfaces of the friction member and the counter member.

10. A break-in apparatus according to claim 9, further comprising rotation control means for controlling the rotating means on the basis of the signal from the vibration sensor.

11. A break-in apparatus according to claim 9, further comprising friction contact pressure control means for controlling the means for supplying a liquid on the basis of the signal from the vibration sensor.

12. A break-in apparatus according to claim 7, further comprising means for measuring a friction torque.

13. A wet-clutch break-in method according to claim 2, further comprising the step of measuring vibration occurring in friction contact surfaces of the friction member and the counter member while carrying out the break-in process.

14. A wet-clutch break-in method according to claim 13, further comprising the steps of:
    obtaining a vibration frequency based on a measurement of vibration; and
    controlling a rotation number difference between the friction member and the counter member so that the vibration frequency does not accord with the natural frequency of a break-in apparatus.

15. A wet-clutch break-in method according to claim 13, further comprising the steps of:
    obtaining a vibration frequency based on the measured result of the vibration; and
    controlling the pressure for friction contact between the friction member and the counter member so that the vibration frequency does not accord with the natural frequency of the break-in apparatus.

16. A wet-clutch break-in method according to claim 2, further comprising the step of measuring a friction torque.

17. A wet-clutch break-in method according to claim 3, further comprising the step of measuring a friction torque.

18. A wet-clutch break-in method according to claim 4, further comprising the step of measuring a friction torque.

19. A wet-clutch break-in method according to claim 5, further comprising the step of measuring a friction torque.

20. A wet-clutch break-in method according to claim 13, further comprising the step of measuring a friction torque.

21. A wet-clutch break-in method according to claim 14, further comprising the step of measuring a friction torque.

22. A wet-clutch break-in method according to claim 15, further comprising the step of measuring a friction torque.

23. A break-in apparatus according to claim 8, further comprising a vibration sensor for measuring vibration occurring in friction contact surfaces of the friction member and the counter member.

24. A break-in apparatus according to claim 23, further comprising rotation control means for controlling the rotating means on the basis of the signal from the vibration sensor.

25. A break-in apparatus according to claim 23, further comprising friction contact pressure control means for controlling the means for supplying a liquid on the basis of the signal from the vibration sensor.

26. A break-in apparatus according to claim 8, further comprising means for measuring a friction torque.

27. A break-in apparatus according to claim 9, further comprising means for measuring a friction torque.

28. A break-in apparatus according to claim 10, further comprising means for measuring a friction torque.

29. A break-in apparatus according to claim 11, further comprising means for measuring a friction torque.

30. A break-in apparatus according to claim 23, further comprising means for measuring a friction torque.

31. A break-in apparatus according to claim 24, further comprising means for measuring a friction torque.

32. A break-in apparatus according to claim 25, further comprising means for measuring a friction torque.

* * * * *